July 16, 1940.　　　　　C. A. OTTO　　　　　2,207,941
PRESSURE REGULATION
Filed Feb. 25, 1938　　　3 Sheets-Sheet 3
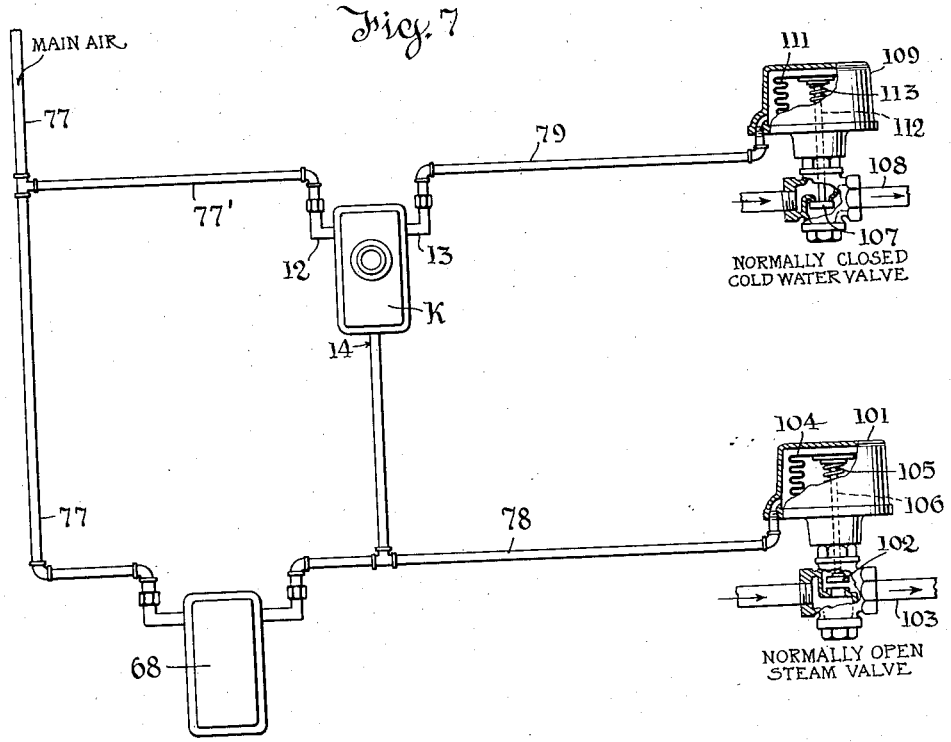
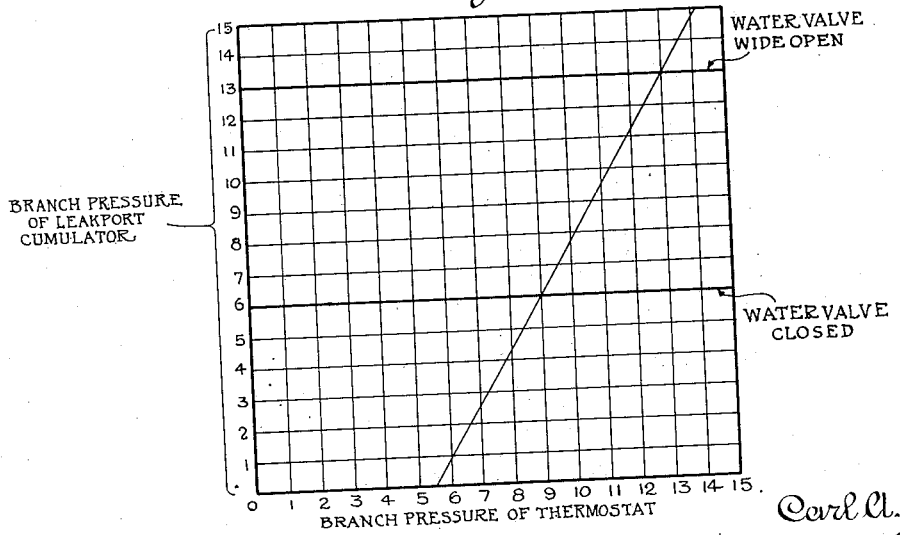
Inventor
Carl A. Otto
By Dodge and Sons
Attorneys Patented July 16, 1940

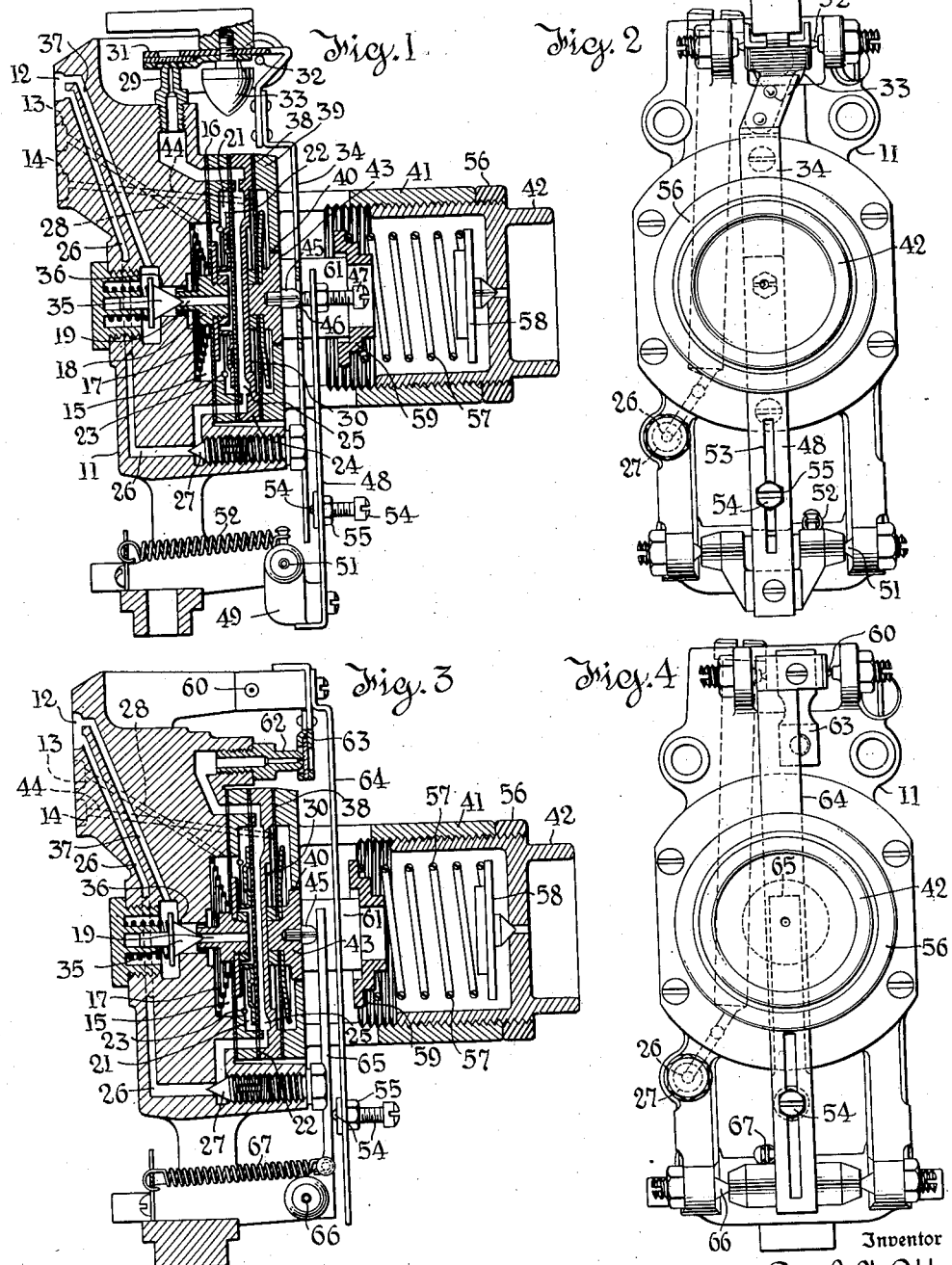

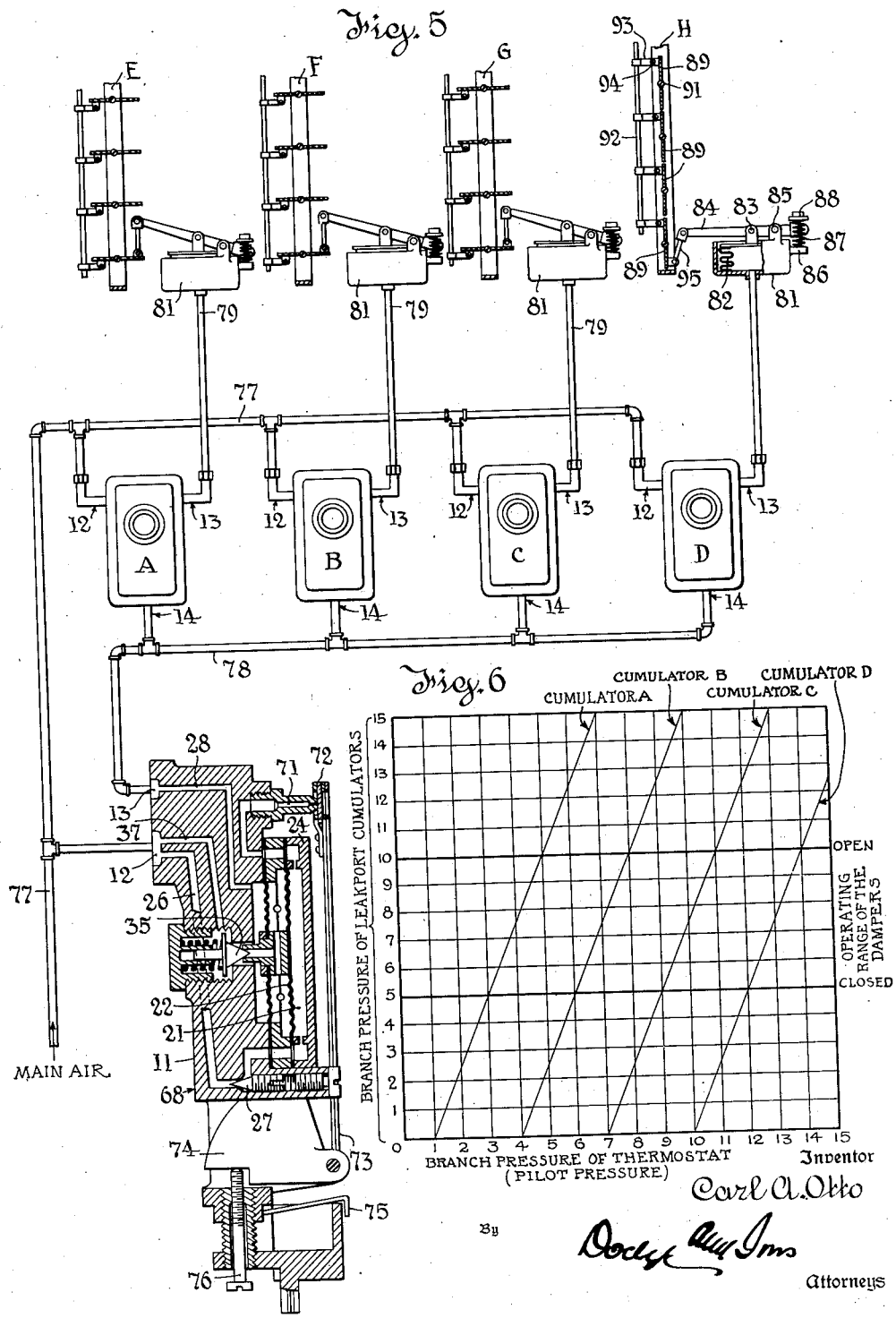

2,207,941

UNITED STATES PATENT OFFICE 2,207,941

PRESSURE REGULATION

Carl A. Otto, Milwaukee, Wis., assignor to Johnson Service Company, Milwaukee, Wis., a corporation of Wisconsin Application February 25, 1938, Serial No. 192,638

10 Claims. (Cl. 236—82)

This invention relates to pressure regulation and particularly to systems employing pressure responsive relays or cumulators capable of adjustment to vary the rate and range of response, or both, of a controlled element with respect to variations in a controlling source.

In pneumatic regulating systems of the prior art it is usual practice to employ a branch line in which the pressure may vary between atmospheric and fifteen pounds per square inch, and to vary that pressure in response to a controlling function. It is frequently desirable to operate a plurality of regulating devices such as valves or dampers controlling heating or cooling media from a single instrument. In operating such temperature controlling elements it is desirable, and frequently necessary, that each device be capable of operation without overlapping the period of operation of any other of the devices. In the control of dampers, for example, this means that one damper must reach its fully closed position before a second damper starts to close and, conversely, that one damper be fully opened before the other starts to open.

In the prior art there have been several ways of meeting this problem, such as increasing restoring spring tension or increasing the operating pressure range, but in every instance an undesirable compromise has to be made. As a practical matter it has never been possible to operate more than two control elements, without overlap, within a fifteen pound range of pressure variation, and consequently it has been necessary to use an additional pneumatic relay for each two devices to be controlled.

The present invention makes use of a pneumatic relay or leak port cumulator having characteristics such that it can be adjusted to different settings and made to operate in a system where several devices are operated through a single relay. In fact the number of controlled devices can be increased from two to four with satisfactory operation of each device and without any overlap whatsoever. In other words, it becomes possible so to adjust each leak port cumulator that the operating ranges of four separate controlled devices may be placed within a fifteen pound pressure range without overlap, and with every advantageous feature of operation which could be obtained where but two controlled devices were used in systems of the prior art.

The main object of the present invention is, therefore, so to construct and arrange a control device such as a leak port cumulator that it can be adjusted for different ratios of amplification or attenuation and also made to come into or go out of operation at a predetermined pressure, and to embody such a device in a pressure regulating system.

In the accompanying drawings:

Figure 1 is a sectional view of one form of pneumatic relay or leak port cumulator embodying the present invention;

Fig. 2 is a front view of the cumulator of Fig. 1;

Fig. 3 is a view similar to Fig. 1 but showing the invention embodied in a modified form of instrument;

Fig. 4 is a front view of the instrument shown in Fig. 3;

Fig. 5 is a diagrammatic view showing a system embodying a plurality of the cumulators of the present invention, these instruments being connected in a system involving the operation of four dampers from a single temperature responsive member;

Fig. 6 is a diagram in which branch pressures of the leak port cumulators are plotted as functions of the branch pressure of a controlling thermostat, and showing the operation of the system of Fig. 5;

Fig. 7 is a diagrammatic view illustrating how the present invention may be applied to a system of temperature control in which the control members supply heating and cooling media to the system; and Fig. 8 is a graph showing the operation of the cooling medium control valve of Fig. 7.

The instrument of the present invention, and as illustrated in Fig. 1 of the drawings, embodies certain basic principles disclosed in the Otto Patent No. 1,500,260 granted July 8, 1924. The present invention utilizes those principles and additional ones which make it possible to use the patented device as a leak port cumulator in pneumatic control systems, and to produce amplification or attenuation of a pilot pressure without increasing the operating range of devices to be controlled.

In Fig. 1 reference character 11 designates the body of an instrument adapted to be mounted on the usual pipe head to which supply and discharge connections are made. Pressure fluid supplied from this pipe head may enter a recess 12 in the rear of the body 11, this being the connection to which main line air pressure is applied. The branch line is connected to a recess 13, while pilot or control pressure is applied to a recess 14.

As in the Otto patent above mentioned, the front of the body 11 of the instrument contains a chamber 15 enclosed by a diaphragm 16 opposed in its rearward movement by a spring 17. Mounted in and carried by the diaphragm 16 is a hub member 18 containing an axial opening 19 which connects at its forward end with a space 21 between the diaphragm 16 and a second and larger diaphragm 22. The space 21 is vented to atmosphere through ports 23.

The front of the instrument carries a cap 24 which cooperates with diaphragm 22 to form a chamber 25 connected to main line air pressure from recess 12 through port 26 and throttling needle valve 27. The chamber 15 is connected to recess 13 through port 28, this being the usual branch line connection in devices of this type. The chamber 25 is connected to atmosphere through a modulating device or valve comprising a leak port 29 controlled by a valve or lid 31, this lid being fulcrumed at 32 and biased to closed position by a weight 33. The lid carries a depending arm or lever 34 through which it is operated in response to changes in pilot pressure in a manner later to be described.

The structure so far described coincides essentially with that shown and described in the Otto patent above referred to. It will be sufficient to state that the parts are so proportioned and adjusted that when air flows through port 26 past throttling valve 27, it reaches the chamber 25 and is exhausted through leak port 29 at a rate which, when the leak port is fully opened, slightly exceeds the rate of flow past the throttling valve 27. The differential area of the diaphragms 16 and 22 is so chosen with regard to the strength of the spring 17 and the working pressure, that the stress of this spring is approximately neutralized by the excess area of the diaphragm 22. Consequently, when the position of valve 31 is varied, the pressure in the controlling chamber 25 is modulated. When the pressure in chamber 25 is sufficient to overpower the spring 17, the two diaphragms move inwardly together until axial opening 19 in hub member 18 engages the conical face of the combined inlet and exhaust valve 35 and seals the chamber 15 against escape of air to chamber 21, and thence to atmosphere. Further movement of the diaphragms 16 and 22 will move the valve 35 off its seat 36 and permit main line air to reach chamber 15 through recess 12 and port 37, and to restore a balance by opposing the pressure in the chamber 25. In this way, variations in the position of the lid or valve 31 in response to a control function, result in variations in branch line pressure in chamber 15, and hence in the supply from recess 13 to which the branch line is connected. These functions just described are well known.

Having described the basic features of the invention, it will now be pointed out how the device has been modified and arranged to adapt it for use as a leak port cumulator capable of universal use with a variety of ratios of amplification and attenuation to meet a variety of diverse uses to which leak port cumulators may be put in pressure regulating systems.

The cap 24 is recessed in its forward face, and this recess is covered by a third diaphragm 38 held in place by a cap 39 centrally perforated at 40. A hollow bracket 41 on cap 39 carries an adjusting member 42. The diaphragm 38 carries at its center a block 43 movable with the diaphragm through the perforation in cap 39. The space 30 between diaphragm 38 and the cap 24 communicates through port 44 with recess 14 to form a pilot pressure connection for varying the branch line pressure. The block 43 carries at its center a pin 45 registering with an opening 46 in the lever 34 and adapted to engage the end of an adjustable stop screw 47. This screw is mounted in the upper end of a slotted lever 48 fulcrumed with bracket 49 at 51. A spring 52 attached to the body of the instrument and to the bracket 49 biases the arm 48 to a position in which the stop screw engages pin 45. A slot 53 in lever 48 serves as a guide for an adjustable stop pin 54 which can be locked in any desired position by a nut 55 and serves to determine the ratio of response of the instrument to variations in pilot pressure applied to the chamber in rear of diaphragm 38. The adjusting member 42 is threaded into the extension 41 and is held in adjusted position by locking ring 56. A loading spring 57, mounted in the adjusting member 42, is seated at one end on an abutment 58 and at its other end in spring seat 59. Seat 59 engages and reacts against a saddle 61 attached to and movable with the block 43.

With the arrangement just described it becomes possible to change the ratio of response of the instrument by moving the stop pin 54 up or down. In the position shown in Fig. 1, a one pound change in pilot pressure results in a one pound change in branch line pressure. Movement of the stop pin 54 upwardly amplifies the response of branch line pressure to pilot pressure, while downward movement of the pin attenuates the response of the branch line pressure. Change in position of the adjusting member 42 to increase or decrease the tension of loading spring 57 changes the control point at which the pilot pressure starts or ceases to exert control on the valve 31. It thus becomes possible to operate several pressure responsive instruments from the branch line of a single intermediate relay of the type shown and described in the above mentioned Otto patent.

The instrument shown in Figs. 1 and 2 is of the Class-1 or direct-acting type, that is one in which an increase in pilot pressure causes a corresponding increase of branch line pressure. Figs. 3 and 4 illustrate a Class-2 or reverse-acting instrument, that is, one in which an increase in pilot pressure causes a decrease in branch line pressure. The two types of instrument differ slightly in arrangement. The parts in the instrument of Figs. 3 and 4 are the same as those in Figs. 1 and 2, except for the location of the modulating valve and the ratio adjusting levers associated with it. It will, therefore, be sufficient for an understanding of this invention to describe only those parts in the Class-2 instrument which differ from those in the Class-1 instrument.

Referring now to Fig. 3, it will be seen that the leak port 62 occupies a horizontal position and cooperates with a lid or valve 63 associated with a depending lever 64, fulcrumed at 60. In this form of the invention the lever 64 is slotted and carries the adjustable stop pin 54 which is adapted to engage a lever 65 fulcrumed at 66 and based against pin 45 by a spring 67. Changes in ratio adjustment are accomplished by adjusting stop pin 54, as in the instrument of Fig. 1. It will, therefore, be sufficient to state that in the Class-2 instrument of Fig. 3, increase in pilot pressure in the chamber 30 causes a decrease in the branch line pressure resulting at 13, the ratio of response depending upon the position of stop pin 54. The pressure at which the instrument comes into operation depends upon the adjustment of the loading spring 57 as before.

In practice, it is often required that a number of dampers or valves or other controlling elements be operated with gradually progressing motion, and in sequence. If only two such elements are to be operated in this manner, the desired action can be obtained by connecting the two dampers or the like to the branch line of one intermediate acting thermostat of the type shown in the Otto patent above mentioned, and then staggering the tension of the springs in the two damper motors so that first one damper will close gradually, and then the other, as the branch pressure of the intermediate thermostat increases from zero to fifteen pounds gauge.

For example, the motor of one damper may be adjusted to start closing the damper at three pounds branch pressure, and to have it fully closed at seven pounds, while the motor of the other damper may be adjusted to start closing the damper at eight pounds branch pressure, and to have it fully closed at twelve pounds. In this example, a range of four pounds change in branch pressure is available for the operation of each damper. Consequently, if more than two dampers are to be operated in sequence, a correspondingly smaller range will be available for each. In prior art devices the use of more than two dampers by increasing the biasing spring tensions, necessitates an increase in branch line pressure which renders it impractical. In any event, it is not possible to proportion the parts so as to render them operative along a line which even approximates the no-load characteristic of damper motors. It is, therefore, impossible from a practical standpoint to operate more than two dampers within a fifteen pound branch pressure range without overlapping of the operation of the dampers. Use of the present invention avoids this difficulty and makes it possible to obtain thoroughly satisfactory sequential operation over a range of fifteen pounds branch pressure without any overlap and with a suitable interval between the operations of the various dampers. Hence, while the entire range of pressure available is that between atmospheric and fifteen pounds gauge, at least four separate instruments each having an operating range of five pounds may be operated without interference with one another.

Although it is possible to apply this principle to numerous devices, it will be described in connection with the system of Fig. 5 as applied to the control of four dampers using a leak port cumulator of the type shown in Fig. 1 or 3, in combination with an intermediate relay of the type shown in the Otto patent before mentioned. It is to be understood that while the relays shown are of the direct-acting type, one or more of them may be of the reverse-acting or Class-2 type.

Referring now to Fig. 5 of the drawings, the thermostat 68 there shown has the characteristics and corresponds substantially to that shown in the Otto patent. Where the parts correspond to those of the device of the present invention, reference characters are the same. Where the parts differ, the reference characters also differ. The thermostat 68 has but two diaphragms and the space at which main line pressure is supplied between the cap 24 and the diaphragm 22 is vented through a modulating device comprising a leak port 71 controlled by a lid 72 in response to a thermostatic element 73, here shown as of the simple bimetallic type. In accordance with usual practice, the thermostat 73 may be adjustable by means of a cam 74 actuated by an adjusting screw 76, the position of adjustment being indicated by the pointer 75.

While the instrument 68 is designated as a thermostat, obviously it may be made responsive to any control variable, and particularly to any variable atmospheric condition such as temperature, humidity, relative humidity, wet-bulb temperature, dry-bulb temperature and the like. Consequently, no limitation to any particular variable is to be implied from the example given.

Main line air will be supplied from a suitable source, such as pipe 77, to the recess 12, and thence through the throttling valve 27 to the space 21. The branch line connection of the thermostat 68 is made at 13 through a pipe 78 to the pilot connections of the leak port cumulators A, B, C and D. In other words, the leak port cumulators associated with the four dampers E, F, G and H, are all supplied from the branch line of the thermostat 68. Main line air pressure is supplied through pipe 77 to the recess 12 and to the four cumulators, and the branch line connections of the cumulators are made through pipes 79 to the damper motors as indicated.

The damper motors which are supplied from the branch line 79 are indicated generally by reference character 81. Since these may all be of the same construction, a brief description of the essential operating parts of one only will be made. Each motor comprises a housing containing a bellows 82 to which pressure is supplied from pipe 79. The bellows is connected to damper actuating lever 84 through a movable fulcrum 83. The fixed fulcrum 85 of the lever is mounted on the housing of the motor, which housing also carries an extension 86 and serves as a reacting abutment for damper closing spring 87. The other end of the spring reacts against a stop 88 on the lever 84.

The damper consists, as here shown, of a plurality of movable vanes 89 each pivoted at 91 and caused to move in concert by a connecting rod 92 carrying arms 93 hinged to the various vanes as at 94. The lowermost vane 89 is operatively connected to lever 84 by a link 95. Consequently, it will be seen that when the pressure in bellows 82 is less than that of the tension of biasing spring 87, the vanes 89 will all occupy their closed positions as shown on damper H. On the other hand, when the pressure supplied to bellows 82 is sufficient to overcome the resistance of spring 87 the lever 84 will be lifted to move the vanes 89 toward their open position as indicated on damper G. Intermediate positions of the damper vanes will be determined by the condition of unbalance between the pressure in bellows 82 and biasing spring 87.

In describing the operation of the system shown in Fig. 5 in connection with the graph of Fig. 6, it will be assumed that each of the cumulators is adjusted as shown in this graph. It will be assumed that the tension of the springs 87 on all the dampers is the same so that each gradually opens as the pressure in its motor increases from five pounds to ten pounds. It will also be assumed that each of the four cumulators is adjusted to a ratio of 2:5, that is, a two pound change of pilot pressure will cause a five pound change of branch pressure. By reference to the graph, it will be seen that the damper E actuated through cumulator A gradually opens as the branch pressure of the thermostat increases from three pounds to five pounds. Similarly, the damper F opens between six and eight pounds, the damper G between nine and eleven pounds, and the damper H between twelve and fourteen pounds, each in response to its associated cumulator. Consequently, although each damper motor has a wide operating range of five pounds, all four of them can be operated in sequence and without overlap, by suitable adjustment of the loading springs 57 and of the ratio adjusting stop pins 54 on each cumulator.

Although numerous examples might be given to illustrate the utility of leak port cumulators embodying the present invention, the illustration will be limited to one further example, such as that given in Fig. 7 of the drawings and the accompanying graph of Fig. 8. The problem to be solved in Fig. 7 is that of operating a normally open steam valve and a normally closed cold water valve, so that the operation of the two valves does not overlap. In other words, it would not be economical to supply cooling water to the system at the same time that steam was being supplied for heating purposes. On rising temperature the steam valve is first closed and then, if the temperature continues to rise, the cold water valve will be opened. Preferably there should be a short interval between the closing of the steam valve and the opening of the cold water valve.

In Fig. 7, reference characters 68 designates a thermostat of the type shown in the above mentioned Otto patent and also illustrated in the system of Fig. 5, just described. Main line pressure is supplied to the thermostat 68 from pipe 77 while the branch line 78 supplies pressure to a bellows motor 101 for operating the steam valve 102. The valve 102 controls the flow of steam through pipe 103. Pressure supplied to the motor 101 acts on bellows 104 connected to valve 102 by stem 106 to close the valve. The valve is biased to open position by a spring 105 when tension of this spring exceeds the pressure within the motor.

The branch line 78 from thermostat 68 also supplies pressure to the recess 14 of the leak port cumulator K, this being the pilot pressure connection of the cumulator. Pipe 77', connected to the main air line, supplies pressure through the recess 12 to the main control chamber of the cumulator, while the pipe 79 connects the branch line of the cumulator to a bellows motor 109, utilized for operating the cold water valve 107 in pipe 108. Here the spring 113 biases the valve to closed position, this spring reacting against a bellows 111 which is connected to the valve 107 through the stem 112.

With the arrangement of Fig. 7, it will be seen that with the ratio of cumulator K set at 4:7, that is a four pound change of pilot pressure in line 14 will cause a seven pound change of pressure in the cumulator branch 79. With the spring tension of cumulator K set at 5½ pounds, it will be seen that the branch pressure of the cumulator rises from six pounds to thirteen pounds as the branch pressure of the thermostat 68 changes from nine pounds to thirteen pounds. Consequently, on rising temperature in the enclosure controlling the thermostat 68, the branch pressure in line 78 will rise. When the branch pressure in line 78 is atmospheric, valve 102 is fully open and valve 107 is closed. At two pounds branch pressure in line 78, valve 102 starts to close and will be fully closed at eight pounds branch pressure. Fig. 8 illustrates the operation of the cold water valve and gives the thermostat and cumulator branch pressures in both the open and closed positions of this valve.

After the one pound differential has been exceeded, valve 107 will start to open at nine pounds branch pressure and will be entirely open at thirteen pounds branch pressure. Consequently, the water valve does not start to open until the steam valve has been closed for an appreciable period. Conversely, on falling temperature affecting the thermostat 68, the cold water valve 107 will be entirely closed before the steam valve 102 commences to open and there will be an interval corresponding to one pound branch pressure before the steam valve opens. Consequently, the system may be made to operate efficiently and without overlap in the operation of the two valves supplying heating and cooling media.

It will be apparent from the two examples given, that the leak port cumulator embodying the present invention can be used in various relations and with various combinations of temperature controlling units. By changing the adjustment of the loading spring and by varying the ratio of response of the branch line pressure of the cumulators, numerous advantageous results not heretofore attainable may be achieved.

While the systems shown indicate that the secondary or modulating relays are of the direct-acting type, it is obvious that they may be of the reverse-acting type, or the two types may be combined in one system where a particular problem requires such a response.

Although the invention has been illustrated as applied to the control of only a few types of units, it will be obvious that it can be applied in various other relations within the scope of the invention, as defined by the claims.

What is claimed is:

1. In a pressure regulating system of the type in which a main line subject to fluid pressure produces response in at least one branch line, a control device comprising a body having a main pressure control chamber, a branch pressure control chamber and a pilot pressure control chamber; a leak port for controlling the escape of pressure fluid from said main pressure control chamber; pressure differential responsive means for causing pressure in said branch chamber to vary in response to variations in the main control chamber pressure; means responsive to pressure variations in said pilot pressure control chamber for controlling said leak port to vary the branch chamber pressure; and mechanical linkage means for varying the relation between the pressure variations in the pilot chamber and the pressure variations in the branch chamber.

2. In a pressure regulating system of the type in which a main line subject to fluid pressure produces response in at least one branch line, a control device comprising a body having a main pressure control chamber, a branch pressure control chamber and a pilot pressure control chamber; a leak port for controlling the escape of pressure fluid from said main pressure control chamber; pressure differential responsive means for causing pressure in said branch chamber to vary in response to variations in the main control chamber pressure; means comprising a diaphragm responsive to pressure variations in said pilot pressure control chamber for controlling the escape of fluid from said leak port to vary the branch chamber pressure; an arm depending from the leak port controlling means; a spring biased arm cooperating with said depending arm and in overlapping relation therewith; and a stop adjustably carried by one of said arms and adapted to engage the other arm to determine the ratio of response of branch chamber pressure to pilot chamber pressure variations.

3. In a pressure regulating system of the type in which a main line subject to fluid pressure produces response in at least one branch line, a control device comprising a body having a main pressure control chamber, a branch pressure control chamber and a pilot pressure control chamber; a leak port for controlling the escape of pressure fluid from said main pressure control chamber; pressure differential responsive means for causing pressure in said branch chamber to vary in response to variations in the main control chamber pressure; means comprising a diaphragm responsive to pressure variations in said pilot pressure control chamber for controlling the escape of fluid from said leak port to vary the branch chamber pressure; an arm carried by said leak port controlling means; a spring biased arm cooperating with said arm; a stop carried by one of said arms and capable of adjustment thereon, said stop being adapted to engage the other arm to determine the ratio of response of branch chamber pressure to pilot chamber pressure variations; and means for adjustably loading said diaphragm to vary the responsive range of the control device.

4. The combination of a source of pressure fluid; a master pneumatic relay, including a variably throttled leak port, said relay in response to variable throttling of said leak port serving to establish a primary regulated pressure which varies through a range below the pressure of supply; a plurality of secondary leak port relays, each serving in response to variable throttling of its leak port to establish secondary regulated pressures which vary in a range below the pressure of supply; and motor means responsive to variations of said primary regulated pressure, and serving to throttle the leak ports of said secondary relays successively and each subject to progressive control through its entire range, whereby the operation of the primary relay through its entire range causes the secondary relays to function serially, each through its entire range.

5. The combination of a source of pressure fluid; a gradual acting relay valve mechanism of the variable leak port type connected to said supply and arranged to establish a primary regulated pressure in response to variable throttling of the leak port, which pressure varies throughout the entire range of the instrument; a plurality of gradual acting fluid pressure relays also of the leak port type, supplied with pressure fluid by said source, the second named relays each including a motor connected to actuate the leak port mechanism of the particular relay throughout its entire range and subject to control at all points in said range in response to a corresponding fraction of the total variation of said primary regulated pressure and each delivering a secondary regulated pressure; and a plurality of controlling devices each arranged to be operated by a corresponding secondary regulated pressure, the parts being so arranged that the controlling devices are operated through the entire available pressure range and are subject to control at all points in said range, each in response to a fractional portion of the response of the first named relay.

6. The combination of a source of pressure fluid; a master pneumatic relay having a main line connected to said source and a branch line, said relay including a variably throttled leak port for causing pressure in said branch line to vary from that of said source to atmospheric; a plurality of pressure controlled devices; a plurality of secondary leak port relays, each having a main line connected to said source, a branch line connected to one of said controlled devices, and a pilot line connected to the branch line of said master relay; and motor means responsive to variations in pressure in said pilot line for throttling the leak ports of said secondary relays over a range from atmospheric pressure to that of said source, whereby the operation of said primary relay through its entire range causes the secondary relays to function serially, each progressively through its entire range and remaining subject to progressive control throughout said range.

7. The combination of a source of pressure fluid; a plurality of pressure controlled devices; a plurality of auxiliary leak port relays each connected to said source and to one of said devices; motor means in each of said relays for variably throttling the leak ports of said relays to control said devices over a pressure range varying between atmospheric and that of said source; a main leak port relay connected to said source and to each of said motor means, said main relay being responsive to pressure variations between atmospheric and the pressure of said source; and means responsive to a variable atmospheric condition for controlling the leak port of said main relay to vary its effect on said auxiliary relays, whereby the operation of the main relay through its entire range causes the auxiliary relays to function serially, each progressively through its entire range and remaining subject to progressive control throughout said range.

8. The combination of a source of pressure fluid; a plurality of pressure responsive devices each having a character of movement requiring a substantial range of actuating pressure; a plurality of relays all connected to said source and each connected to control the pressure in the corresponding one of said devices; a plurality of pressure responsive valve means one for each relay, and each arranged to establish a variable regulatory pressure in the corresponding relay; and a pressure regulating valve connected to said source and controlling the pressure in said pressure responsive means, the latter being so arranged that they respond serially as the pressure delivered by said pressure regulating valve varies through its range of operation and remaining subject to progressive control throughout said range; and means for adjusting said pressure regulating valve to vary the pressure established thereby.

9. In a pressure regulating system of the type in which a main line subject to fluid pressure produces response in at least one branch line, a control device comprising a body having a main pressure control chamber, a branch pressure control chamber and a pilot pressure control chamber; a leak port for controlling the escape of pressure fluid from said main pressure control chamber; pressure differential responsive means for causing pressure in said branch chamber to vary in response to variations in the main control chamber pressure; means responsive to pressure variations in said pilot pressure control chamber for controlling said leak port to vary the branch chamber pressure; means for varying the relation between the pressure variations in the pilot chamber and the pressure variations in the branch chamber; means for adjustably loading the means responsive to variations in pilot chamber pressure to vary the responsive range of the control device; and means including a leak port controlled in response to changes in an atmospheric condition for causing variations in pressure in said pilot pressure control chamber.

10. In a pressure regulating system of the type in which a main line subject to fluid pressure produces response in at least one branch line, a source of pressure fluid; a regulating device connected to said source and arranged to produce a derived pressure which varies between atmospheric pressure and the pressure of said source and in response to variations in an atmospheric condition; a plurality of pressure operated devices having a combined effective operating pressure differential exceeding the pressure of said source; and a plurality of relay devices, one interposed between each of said pressure operated devices and said regulating device for causing said pressure operated devices to respond serially and each to respond progressively and remain subject to control throughout its range of movement, and to complete such range of movement before the next succeeding device begins its movement.

CARL A. OTTO.